United States Patent [19]

Hanneman

[11] 4,327,155
[45] Apr. 27, 1982

[54] COATED METAL STRUCTURES AND METHOD FOR MAKING

[75] Inventor: Rodney E. Hanneman, Clifton Park, N.Y.

[73] Assignee: General Electric Company, Schenectady, N.Y.

[21] Appl. No.: 220,663

[22] Filed: Dec. 29, 1980

[51] Int. Cl.$^3$ .................. B05D 1/08; B05D 5/06
[52] U.S. Cl. .................. 428/556; 428/557; 428/564; 428/639; 428/680; 428/937; 356/5; 356/318; 250/302; 250/461 R; 427/140; 427/142; 427/157; 427/160; 427/34; 427/404; 427/405; 427/423; 427/10
[58] Field of Search .................. 427/8, 10, 142, 140, 427/157, 160, 34, 404, 405, 419.2, 423; 73/7; 428/621, 623, 632, 686, 469, 539; 356/5, 318; 250/302, 461 R

[56] References Cited

U.S. PATENT DOCUMENTS

| | | | |
|---|---|---|---|
| 2,320,842 | 1/1943 | Arnold et al. | 427/157 |
| 2,976,716 | 3/1961 | DeHaven | 73/7 |
| 3,508,890 | 4/1970 | Fontanella | 51/295 |
| 3,927,223 | 12/1975 | Takabatake et al. | 427/34 |

FOREIGN PATENT DOCUMENTS 486999  10/1952  Canada ........................... 427/157

*Primary Examiner*—Shrive P. Beck
*Attorney, Agent, or Firm*—William A. Teoli; James C. Davis, Jr.

[57] ABSTRACT

Dual coated erosion resistant metal or ceramic structures are provided having an interior adherent indicating metallic or ceramic layer containing a UV sensitive phosphor and an exterior ceramic or metallic protective coating. A method of making such dual coated structures also is provided involving the plasma or flame spraying of blends of particulated metal powder or metal oxide powder and a metal oxide UV sensitive phosphor onto the surface of the metal or ceramic structure.

15 Claims, No Drawings

COATED METAL STRUCTURES AND METHOD FOR MAKING

CROSS REFERENCE TO RELATED APPLICATIONS

Reference is made to copending application of Paul A. Siemers and Harvey D. Solomon, Ser. No. 229,243, filed Jan. 20, 1981, for Method of Coating Substrates and Coated Articles Obtained Therefrom, and assigned to the same assignee as the present invention.

BACKGROUND OF THE INVENTION

It is generally known that hard facing metals on such areas as valve seats, leading edges of turbine buckets, cavitation prone pump parts, and in design areas requiring changes of direction of particulates and fluids, frequently are exposed to high levels of differential erosion wear. A common procedure to reduce the rate of erosion on the surface of such hard facing metals is to flame spray or plasma spray the exposed metal surface with powdered metal such as 450Ni or a metal oxide powder. For example, zirconium oxide, or blends of zirconium oxide, calcium oxide, or yttrium oxide, etc., can be plasma sprayed to produce an adherent ceramic protective coating on the surface of a hard facing metal to extend its service life. Typical examples of the use of powdered of metallic oxides or metals to coat superalloys used in the turbines of jet aircraft are shown by Palmer et al, U.S. Pat. No. 4,055,705, and Weatherly et al, U.S. Pat. No. 4,095,003, wherein particulated metal is plasma sprayed onto the surface of the superalloy.

Although the use of such protective metallic or ceramic coatings on the surface of such hard facing metals has been found to satisfactorily extend the service life of metallic substrates subjected to a high degree of differential surface erosion or wear, it has been found that the maintenance of such coated metallic structures is often complicated. It is often difficult, for example, to predict when the protective coating on the treated substrate has to be renewed before undue exposure of bare metallic substrate surface occurs resulting in severe corrosion or erosion problems.

A procedure which has been suggested for indicating the rate of erosion of a protective coating on a metal substrate is by using an indicator, such as bismuth trioxide, which varies from yellow to deep purple in color in an undercoating, as shown by Fontanella, U.S. Pat. No. 3,508,890. Another technique which has been used by the paint industry to indicate thin areas of coverage on a metal substrate is the use of a small amount of a fluorescent, or phosphorescent material in the primer or ground coat. However, a fluorescent material, such as zinc sulfide would not be suitable under plasma or flame spraying conditions, requiring temperatures of about 2000° C. or more.

The present invention is based on the discovery, that certain UV sensitive metal oxide phosphors, for example, an alumina-based phosphor, having the nominal formula, $Ce_{1-X-Y}La_XTb_YMgAl_{11}O_{19}$, where $0<X<0.2$ and $0.2<Y<0.4$, cerium magnesium aluminate doped with +3 terbium, or yttrium oxide doped with +3 europium will fluoresce when utilized in an effective amount after being plasma sprayed or flame sprayed as an undercoat mixture onto various metal substrates. This result is quite surprising particularly in view of the fact that the phosphor in the indicating coating mixture is capable of surviving under plasma spraying conditions.

STATEMENT OF THE INVENTION

In the method of periodically applying under plasma or flame spraying conditions a protective metallic or ceramic coating on a substrate surface subject to a high degree of surface erosion when in use, by plasma or flame spraying the substrate surface with powdered metal or a powdered metal oxide blend whereby it is difficult to determine after a particular service period whether additional surface spraying is required, the improvement which comprises, plasma or flame spraying the substrate with a mixture of metal powder, or metal oxide powder, having an effective amount of UV sensitive phosphor to produce a UV sensitive metallic or ceramic indicating coating for signaling, upon exposure to UV radiation, when additional plasma or flame spraying of the metal substrate with powdered metal or powdered metal oxide should be undertaken.

Metal oxide which can be plasma or flame sprayed onto the surface of metallic substrates in accordance with the practice of the present invention can have an average particle size of from 5 to 150 microns and preferable from 25 to 100 microns. There are included among the powdered metal oxides, compounds such as, $Al_2O_3$, $BaTiO_3$, $CeO_2$, $MgO$, $TiO_2$, $ZrO_2$ and $ZrSiO_2$.

Metal carbides and nitrides can also be utilized in the practice of the present invention. These metal carbide, boride and nitride powders can have a particle size of from 2 to 150 microns and preferably from 5 to 110 microns and include, for example, CrC, HfC, ZrC, WC and TN.

Flame sprayable or plasma sprayable metal powders also can be utilized in the practice of the present invention. These metal powders can have a particle size of from 5 to 150 microns, and preferably from 10 to 125 microns and include, for example, Co, Cr, Mo, Ni and W. Alloy powders can also be used. The 450 Ni powder is an example of just one such alloy. These alloys include Ni-Cr alloys, Fe-Cr-Ni stainless alloys and Co base alloys. The alloy powders are generally in the same size range as the metal powders.

Among the phosphors which can be employed in combination with either or both of the above described metal oxides, carbides, borides or nitrides, or metal powders include such materials as yttrium oxide doped with +3 europium, $Ce_{1-X-Y}La_XTb_YMgAl_{11}O_{19}$, where $0<X<0.2$ and $0.2<Y<0.4$, and specifically $Ce_{0.7}Tb_{0.3}MgAl_{11}O_{19}$ (CAT) etc. Additional phosphors which also can be used are, for example, $Zn_2SiO_4$, doped with Mn or As, $La_2O_2S$ doped with Tb, $YVO_4$ doped with Eu, $Y_2O_2S$ doped with Eu, $CaWO_4$, ZnS doped with Ag or Cu, ZnCdS doped with CU or Ag, $KmgF_3$ doped with Mn, $Gd_2O_2S$ doped with Tb.

Among the substrates which can be treated in accordance with the method of the present invention are, for example, metal substrates, such as steel and include, for example, valve seats, turbine buckets, turbine blades, vanes, combustor liners, transition pieces, nozzles, reaction vessels, pressure vessels, boilers and various other surfaces exposed to differential erosion or corrosion.

In addition, the ceramic substrates also can be treated in accordance with the method of the present invention such as alumina shafts having conductive metal deposited layers subject to differential wear or differential erosion or corrosion.

In the practice of the invention, a metal or ceramic substrate can be initially plasma or flame sprayed to a thickness of from about $5 \times 10^{-1}$ mil to about 100 mil with a UV containing phosphor mixture, or "phosphor mixture" which hereinafter will signify either a mixture of the above described phosphor with either a metal powder, or metal oxide, boride, carbide or nitride powder as previously defined. The coated substrate can then be further plasma or flame sprayed with either metal powder or metal oxide, carbide, boride or nitride, to a thickness of from about $5 \times 10^{-1}$ mil to any desired thickness. Plasma temperatures and the corresponding partial residence time must be sufficient such that melting of each species occurs prior to impact on the substrate.

An effective amount of phosphor is 1 to 75% by volume of phosphor, based on the total volume of phosphor-metal compound mixture selected from metal oxide, carbide, boride, or nitride.

Effective results can be determined by measuring the difference between the light emitted from a surface substantially free of phosphor with a surface having an effective amount of phosphor, as previously defined. A standard U.V. 256 nm UV lamp, held at a distance sufficient to provide a light intensity of at least $1200\mu$ watts per sq. cm will show an increase of at least 0.1 ft-lamberts when used on a surface derived from a sprayable mixture containing an effective amount of UV sensitive phosphors compared to a coating derived from a mixture free of phosphor. Intensities of over 80 ft-lamberts have been recorded.

In order that those skilled in the art will be better able to practice the present invention, the following examples are given by way of illustration and not by way of limitation. All parts are by weight unless otherwise indicated.

EXAMPLE 1

A mixture of 2 parts by volume of powdered 450Ni metal powder (a powder prepared by Metco Co., Westbury, NY, consisting of 45 to 90 micron sized particles each consisting of approximately 4.5 wt. % Al and 94.5 wt. % Ni) to one part by volume of yttrium oxide doped with +3 europium (at approximately 1 micron size particle) was rolled in a jar for 24 hours. The resulting blend was then plasma sprayed with a Metco 3M plasma spray system. A thickness of approximately 0.005" of the powder mixture was sprayed onto a Fe steel substrate which was initially at room temperature. The spray distance was approximately 6 to 8 inches and a current of 500 amps was used with an 80% argon −20% hydrogen plasma gas and an argon gas carrier stream to carry the powder from the powder feeder.

The sprayed substrate exhibited spots of red fluorescence which could not be washed off. This illustrating that the phosphor survived the plasma spraying and was incorporated into the plasma sprayed surface. With an intensity of approximately $1200\mu$ watts/cm$^2$ of 256 nm source light, the intensity of the resultant fluorescent light was 0.35 ft-lambert above background at about 7.5 inches from the substrate.

The same procedure was followed, except that four parts by volume of the 450Ni powder was mixed with one part by volume of the phosphor. The fluorescence was found to be less an intensity using 256 nm light having $1200\mu$ watts/cm$^2$. The intensity of the resultant fluorescent light was found to be 0.15 ft-lambert above background at about 7.5 inches from the substrate.

EXAMPLE 2

A mixture of equal volumes of WC and CAT powder was plasma sprayed onto a C steel substrate. An approximately 0.005 to 0.010 inch composite layer of the WC and CAT powder was deposited using the same plasma spray conditions with the same plasma spray system as was used in Example 1. The fluorescence of the deposited layer was measured with the same apparatus as was employed in Example 1. With an intensity of $1200\mu$ watts/cm$^2$ of 256 nm light, the intensity of the resultant fluorescent light was 4.0 ft-lamberts above background at about 7.5 inches from the substrate.

EXAMPLE 3

A mixture of equal volumes of 450 Ni powder and CAT powder was plasma sprayed onto a C steel substrate utilizing the same plasma spray conditions with the same plasma spray system as was used in Examples 1 and 2. Approximately 0.010" was plasma sprayed onto the C steel substrate. The approximately 0.010" of pure 450 Ni was plasma sprayed on top of the layer containing the phosphor. A corner was then ground off of the specimen. It was found that the exposed corner layer containing the CAT phosphor fluoresced. This demonstrated that the phosphor was still effective although coated with the 450Ni and that the fluorescent layer was effective as an indicating layer. A region of the substrate which was not covered by the pure 450Ni overlay exhibited a fluorescence of greater than 43 ft-lamberts above background when tested in the manner described in Examples 1 and 2.

Although the above examples are directed to only a few of the very many variables which can be utilized in the practice of the method of the present invention, it should be understood that the present invention is directed to a much broader variety of powdered metals and metal oxides as well as phosphors, which can be combined with such materials to produce adherent indicating refractory coatings on various substrates, such as metallic, ceramic, etc.

What I claim as new and desire to secure by Letters Patent of the United States is:

1. In the method of periodically applying a protective metallic or ceramic coating on the surface of a substrate subject to surface erosion, corrosion or wear when in use, by plasma or flame spraying the substrate surface with powdered metal or a powdered metal oxide blend whereby it is difficult to determine after a particular service period whether additional surface spraying is required, the improvement which comprises, plasma or flame spraying the substrate with a mixture of metal powder, or metal oxide powder having an effective amount of a UV sensitive phosphor to produce a UV sensitive metallic or ceramic indicating coating for signaling, upon exposure to U.V. radiation, when additional plasma or flame spraying of the metal substrate with powdered metal or powdered metal oxide should be undertaken.

2. A method in accordance with claim 1, where the plasma sprayed substrate is steel.

3. A method in accordance with claim 1, where a mixture of metal powder and UV sensitive metal oxide phosphor is plasma or flame sprayed.

4. A method in accordance with claim 1, where a mixture of metal oxide powder and UV sensitive metal oxide phosphor is plasma or flame sprayed.

5. A method in accordance with claim 1, where UV sensitive phosphor is, $$Ce_{1-X-Y}La_XTb_YMgAl_{11}O_{19},$$

where $0<X<0.2$ and $0.2<Y<0.4$.

6. A method in accordance with claim 1, where UV sensitive phosphor is $Ce_{0.7}Tb_{0.3}MgAl_{11}O_{19}$.

7. A method in accordance with claim 5, where UV sensitive phosphor is cerium magnesium aluminate doped with +3 terbium.

8. A method in accordance with claim 3, where UV sensitive phosphor is yttrium doped with +3 europium.

9. A coated metallic article having an inner metallic coating of metal and an effective amount of a UV sensitive phosphor, and outer metallic coating.

10. A coated metallic article having an inner metallic coating of metal and an effective amount of a UV sensitive phosphor and outer ceramic coating.

11. A coated metallic article having an inner ceramic coating of metal oxide and an effective amount of a UV sensitive phosphor and an outer metallic coating.

12. A coated metallic article having an inner ceramic coating of a metal oxide and an effective amount of a UV sensitive phosphor and an outer ceramic coating.

13. A coated metallic article in accordance with claim 3, where the UV sensitive phosphor is $Ce_{0.7}Tb_{0.3}MgAl_{11}O_{19}$.

14. A coated metallic article in accordance with claim 1, where the inner and outer metallic coating is plasma or flame sprayed 450Ni.

15. A coated ceramic article in accordance with claim 1.

* * * * *